United States Patent [19]

Peer et al.

[11] Patent Number: 6,054,085
[45] Date of Patent: Apr. 25, 2000

[54] MEMBRANE

[75] Inventors: Martin James Peer, Basing; Dipak Jani, Basingstoke, both of United Kingdom

[73] Assignee: Thames Water Products Limited, London, United Kingdom

[21] Appl. No.: 09/015,596

[22] Filed: Jan. 29, 1998

[30] Foreign Application Priority Data

Jan. 30, 1997 [GB] United Kingdom .................... 9701952
Jan. 31, 1997 [GB] United Kingdom .................... 0702022

[51] Int. Cl.⁷ ....................................................... D27J 5/00
[52] U.S. Cl. ............................ 264/127; 264/178; 264/49; 210/500.41; 210/500.23; 210/500.42; 210/646; 156/155; 156/296
[58] Field of Search ..................................... 210/651, 654, 210/652, 321, 89, 800, 43, 500.23, 500.41, 500.42, 450, 500.21; 264/41, 48, 69, 127, 178, 171.26, 178 F; 156/155, 296, 166; 429/247, 249; 514/56, 54

[56] References Cited

U.S. PATENT DOCUMENTS

| | | | |
|---|---|---|---|
| 4,696,748 | 9/1987 | Nitadori et al. | 210/636 |
| 4,812,269 | 3/1989 | Harttig et al. | 264/41 |
| 5,122,273 | 6/1992 | Rekers et al. | 210/500.27 |
| 5,156,888 | 10/1992 | Haub et al. | 427/163 |
| 5,232,601 | 8/1993 | Chu et al. | 210/646 |
| 5,286,324 | 2/1994 | Kawai et al. | 156/155 |
| 5,340,480 | 8/1994 | Kawata et al. | 210/500.23 |
| 5,344,702 | 9/1994 | Haubs et al. | 428/305.5 |
| 5,762,798 | 6/1998 | Wenthold et al. | 210/500.23 |

*Primary Examiner*—Merrick Dixon
*Attorney, Agent, or Firm*—Bucknam and Archer

[57] ABSTRACT

A method of producing a membrane comprises providing a solution containing a plurality of polymers in a non-aqueous liquid solvent, at least one of the polymers (hereinafter referred to as the "first polymer") having been prepared by polymerizing at least one vinyl or acrylic monomer, at least one other of the polymers being a membrane-forming hydrophobic polymer (hereinafter referred to as the "second polymer"), the first polymer and the second polymer being mutually incompatible in said solution, and contacting the solution with an aqueous medium thereby to precipitate the polymers from the solution to form the membrane.

10 Claims, No Drawings

MEMBRANE

FIELD OF THE INVENTION

The present invention relates to a method of producing a membrane. In particular, but not exclusively, the invention relates to a method of producing a membrane useful for filtration, especially nano-filtration and ultra filtration.

BACKGROUND OF THE PRIOR ART

Membranes made from hydrophobic polymers, such as aryl sulphones and PVDF, have been used in a variety of industries for many years. Although such membranes tend to be mechanically and chemically more robust that membranes made from hydrophilic polymers, such as cellulose acetate and polyacrylonitrile, their usefulness is often limited by their susceptibility to fouling as a result of ad- and absorption of material from solution being processed.

SUMMARY OF THE INVENTION

In a first aspect the present invention provides a method of producing a membrane comprising providing a solution containing a plurality of polymers in a non-aqueous liquid solvent, at least one of the polymers (hereinafter referred to as the "first polymer") having been prepared by polymerizing at least one vinyl or acrylic monomer, at least one other of the polymers being a membrane-forming hydrophobic polymer (hereinafter referred to as the "second polymer"), the first polymer and the second polymer being mutually incompatible in said solution, and contacting the solution with an aqueous medium thereby to precipitate the polymers from the solution to form the membrane.

The first polymer may be formed in situ i.e. by incorporating into the solvent at least one vinyl or acrylic monomer and polymerizing the monomer in the solvent.

Instead of the first polymer being produced by in situ polymerisation it may be added to the solution of the second polymer with stirring or agitation to produce the solution comprising the plurality of polymers.

The second polymer preferably includes at least one polymer selected from polysulfones, polyetersulfones and PVDFs.

The invention enables the fouling resistance of nano- and ultra-filtration membranes made from hydrophobic polymers to be improved without sacrificing their superior chemical and mechanical properties.

Polymerisation of the vinyl or acrylic monomer may be achieved by a chemical initiator or by exposure of the solution to light, such as daylight, with or without the incorporation of a photoinitiator into the solution.

The solution comprising the polymers may be an emulsion, preferably a stable emulsion, comprising the first polymer evenly dispersed therein and with the second polymer being dissolved in the solvent.

The vinyl or acrylic monomer may be 2-hydroxymethylacrylate, which gives a hydrophilic first polymer, or methyl or ethyl methacrylate, both of which give a less hydrophilic first polymer.

The aqueous medium may be water.

The solution should be in a desired shape as it contacts the aqueous medium in order to ensure that the membrane produced is of the required shape. To this end the solution is generally formed into the desired shape prior to contact with the aqueous medium and maintained in that shape as it contacts the aqueous medium or is formed into the desired shape as it contacts the aqueous medium.

The membrane may be required to be in the form of a flat sheet or in the form of a tube.

The solution may be coated onto a substrate or support prior to contact with the aqueous medium so that the membrane is formed on the substrate or support.

If the substrate or support is pervious or porous the membrane may be left on the substrate or support when used for filtration. Alternatively if the substrate or support is impervious it will be necessary to remove the membrane from the substrate or support before using the membrane for filtration.

If the membrane is to be in the form of a hollow fibre or tube the solution may be introduced into the aqueous medium by spinning through a spinneret or by use of a casting bob.

Alternatively, for the purpose of producing a tubular membrane, the substrate or support may be in the form of a tube and the membrane may be formed on the inside or outside of the tube.

The first polymer is preferably present in the solution in an amount not exceeding 20% by weight based on the weight of the second polymer otherwise the membrane produced tends to compact under pressure.

The concentration of the first polymer in solution is preferably 1% to 5% by weight.

The concentration of the second polymer in solution is preferably 15 to 30% by weight.

The coating is preferably applied to the substrate in a thickness of 0.12 mm to 0.51 mm.

The substrate is preferably of a non-woven material.

In a second aspect the invention provides a membrane comprising a vinyl or acrylic polymer dispersed in a hydrophobic polymer and either not carried on a substrate or carried on a pervious or porous substrate. Such a membrane, when not carried on a substrate, may be in the form of a hollow fibre. The hydrophobic polymer may comprise at least one polymer selected from polysulfones, polyethersulfones and PVDFs.

In a third aspect the invention provides a solution comprising a plurality of polymers and as described above in connection with the first aspect of the invention.

Given below are a comparative example and examples illustrating the invention.

COMPARATIVE EXAMPLE 23 g of Victrex P5200 polyethersulfone were dissolved in a mixture of 55 g of N methyl-pyrrolidone and 22 g of 2-pyrrolidone at ambient temperature. A thin layer (0.010" (0.25 mm) thick) of the resulting solution was spread on the inside of a porous support tube of non-woven material (polyethylene). The coated tube was then held in air at ambient temperature for 30 seconds prior to immersion in tap water at 12° C. After 30 minutes the support tube with its membrane was removed from the gelation bath and washed for I hour in running tap water to remove residual solvent prior to testing.

Victrex P5200 was a commercial grade of polyethersulfone made by ICI.

Tubular membranes were prepared in the same manner from the following solutions:

EXAMPLE 1

5.0 g of methyl methacrylate, 0.1 g α-azo-iso-butyronitrile and 0.5 g of the surfactant Ethylan HB4 were added to 100 g of a solution prepared in accordance with the comparative example above. The resulting solution was then held at 50 to 55° C. for 24 hours.

EXAMPLE 2

5.0 g of methylmethacrylate and 0.5 g of the surfactant Ethylan HB4 were added to 100 g of a solution prepared in accordance with the comparative example above. The solution was then exposed to daylight for a total of 24 hours at room temperature.

EXAMPLE 3

5.0 g of ethyl methacrylate and 0.5 g of the surfactant Ethylan HB4 were added to 100 g of a solution prepared in accordance with the comparative example above. The solution was then exposed to daylight for a total of 24 hours at room temperature.

EXAMPLE 4

2.0 g of 2-hydroxyethyl methacrylate and 0.1 g α-azo-iso-butyronitrile were added to 100 g of a solution prepared in accordance with the comparative example above. The resulting solution was then held at 50 to 55° C. for 24 hours.

EXAMPLE 5

2.0 g of hydroxypropyl methacrylate and 0.1 g α-azo-iso-butyronitrile were added to 100 g of a solution prepared in accordance with the comparative example above. The resulting solution was then held at 50 to 55° C. for 24 hours.

EXAMPLE 6

5.0 g of 1-vinylimidazole and 0.05 g α-Azo-iso-butyronitrile were added to 100 g of a solution prepared in accordance with the comparative example above. The resulting solution was then held at 50 to 55° C. for 24 hours.

EXAMPLE 7

5.0 g of 2-hydroxyethyl methacrylate were added to 100 g of a solution prepared in accordance with the comparative example above. The solution was then exposed to daylight for a total of 24 hours at room temperature.

EXAMPLE 8

5.0 g of 2-hydroxyethyl methacrylate and 0.5 g of the surfactant Ethylan HB4 were added to a pre-prepared solution containing 25.0 g of the polysulfone Udel P1700 and 69.5 g N-methylpyrrolidone. The solution was then exposed to daylight for a total of 24 hours at room temperature.

Details of the above monomers and polymers are as follows:

|  | CAS Number | Formula |
|---|---|---|
| Monomers | | |
| 2-hydroxyethyl methacrylate | 868-77-9 | $H_2C=C(CH_3)CO_2CH_2CH_2OH$ |
| hydroxypropyl methacrylate | 27813-02-1 | $H_2C=C(CH_3)CO_2C_3H_6OH$ |
| acrylic acid | 79-10-7 | $H_2C=CHCO_2H$ |
| Polymers | | |
| Poly(methyl methacrylate) | 9011-14-7 | $[-H_2C-C(CH_3)CO_2CH_3)-]_n$ |
| Poly(2-hydroxyethyl methacrylate) | 25249-16-5 | $[-H_2C-C(CH_3)CO_2CH_2CH_2OH-]_n$ |

Membrane testing.

Table 1 below details the test results obtained for membranes prepared in accordance with Examples 1 to 8. The membranes, left on the support tubes on which they were formed, were run for 0.5 hours at the stated conditions on re-circulated feed solutions prior to measuring their performance. The % solute passages for Examples 4 to 9 are based on conductivity measurements.

TABLE 1

| Example | Test solute | Test pressure | Flux(1/m²hr, 15° C.) | % solute passage |
|---|---|---|---|---|
| Comparative | 150 ppm Pharmacia 70k dextran | 3.0 | 73.6 | 64.4 |
| 1 | 150 ppm Pharmacia 70k dextran | 3.0 | 150.0 | 76.5 |
| 2 | 150 ppm Pharmacia 70k dextran | 3.0 | 110.0 | 27.4 |
| 3 | 150 ppm Pharmacia 70k dextran | 3.0 | 133.0 | 70.9 |
| 4 | 5000 ppm MgSO₄ | 20.0 | 190.0 | 85.0 |
| 5 | 5000 ppm MgSO₄ | 20.0 | 50.0 | 60.0 |
| 6 | Tap water | 20.0 | 355.0 | 78.9 |
| 7 | Tap water | 20.0 | 233.0 | 75.0 |
| 8 | Tap water | 20.0 | 34.0 | 69.0 |

What is claimed is:

1. A method of producing a membrane which comprises the steps of:

a) preparing a solution containing a plurality of polymers in a non-aqueous liquid solvent, at least one of the polymers, hereinafter referred to as the "first polymer", said first polymer being prepared by polymerizing at least one vinyl or acrylic monomer, at least another of the polymers being a membrane-forming hydrophobic polymer, hereinafter referred to as the "second polymer", the first polymer and the second polymer being mutually incompatible in said solution, and b) then contacting said solution with an aqueous medium thereby to precipitate the polymers from the solution to form the membrane.

2. The method according to claim 1 wherein said first polymer is formed in situ.

3. The method according to claim 1 wherein said solution is formed into a flat sheet and then is contacted with said aqueous medium to form the membrane.

4. The method according to claim 1 wherein said solution is supported on a support or substrate and then is contacted with said aqueous medium to form the membrane.

5. The method according to claim 4 wherein said support or substrate is pervious or porous.

6. The method according to claim 1 wherein said solution is formed into a tubular shape and is then contacted with said aqueous medium to form the membrane as a hollow tube or fibre.

7. The method according to claim 1 wherein said first polymer is methyl, ethyl, hydroxyethyl, hydroxypropyl methacrylate or vinyl imidazole and said second polymer is a polysulfone, a polyethersulfone or PVDF and said first polymer is present in said solution in an amount not in excess of 20% by weight based on the weight of said second polymer, said second polymer being in amount of 15–30% by weight of said solution.

8. The method according to claim 6 wherein the hollow tube or fibre is formed by introducing said solution into said aqueous medium by spinning or by means of a casting bob.

9. The method according to claim 1 wherein said aqueous medium is water.

10. The method according to claim 1 wherein said aqueous medium by spinning or by means of a casting bob.

* * * * *